July 31, 1934.   A. B. RYPINSKI   1,968,354
METER CUT-OUT
Original Filed Nov. 10, 1928   2 Sheets-Sheet 1

Inventor
ALBERT B. RYPINSKI.
By his Attorney
J. C. Anthony Ulina

July 31, 1934. A. B. RYPINSKI 1,968,354
METER CUT-OUT
Original Filed Nov. 10, 1928  2 Sheets-Sheet 2
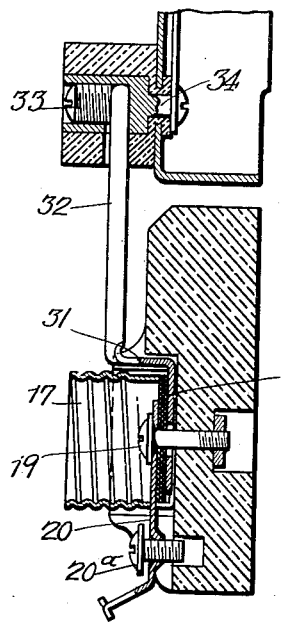
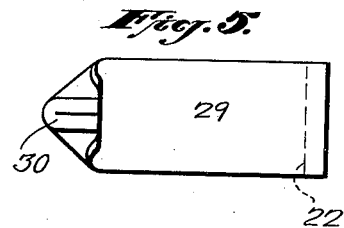
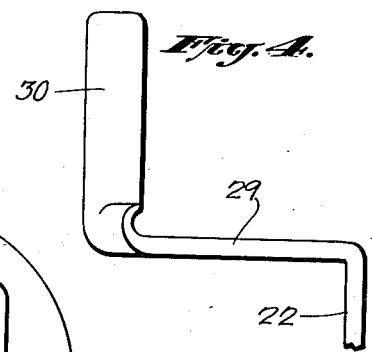
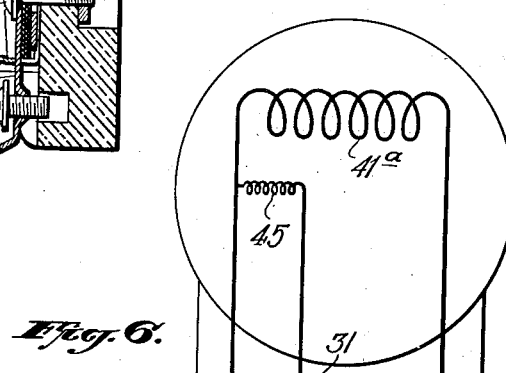
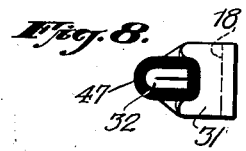
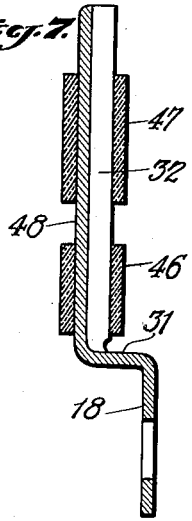
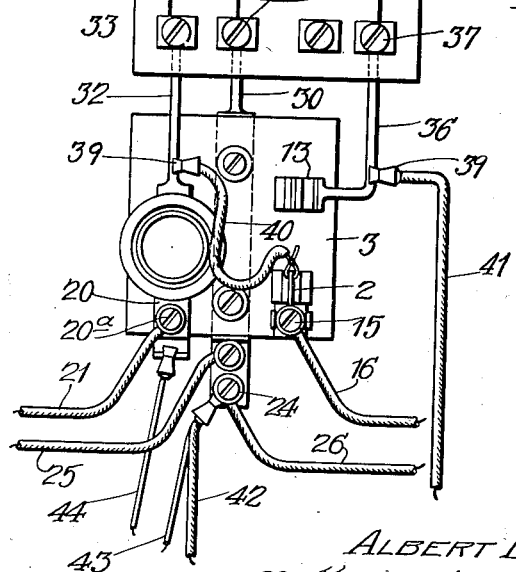
Inventor
ALBERT B. RYPINSKI.
By His Attorney Patented July 31, 1934

1,968,354

UNITED STATES PATENT OFFICE 1,968,354

METER CUT-OUT

Albert B. Rypinski, Laurelton, N. Y., assignor, by mesne assignments, to Metropolitan Device Corporation, a corporation of New York Application November 10, 1928, Serial No. 318,417
Renewed December 22, 1933

6 Claims. (Cl. 247—2)

Cutouts for meters on service lines are liable to be tampered with by customers. The present improvement is directed to prevent the theft of current by such tampering and also to the lowering of the cost of production and installation. The accompanying drawings illustrate one embodiment of the invention.

Fig. 3 is a vertical transverse section through the fuse and related parts.

Fig. 4 is a separate side elevation of the upper part of the ground fitting.

Fig. 5 is a plan of Fig. 4.

Fig. 6 is a diagram of testing connections.

Fig. 7 is a vertical section, partly in elevation of another fitting.

Fig. 8 is a plan of Fig. 7.

Figure 1:
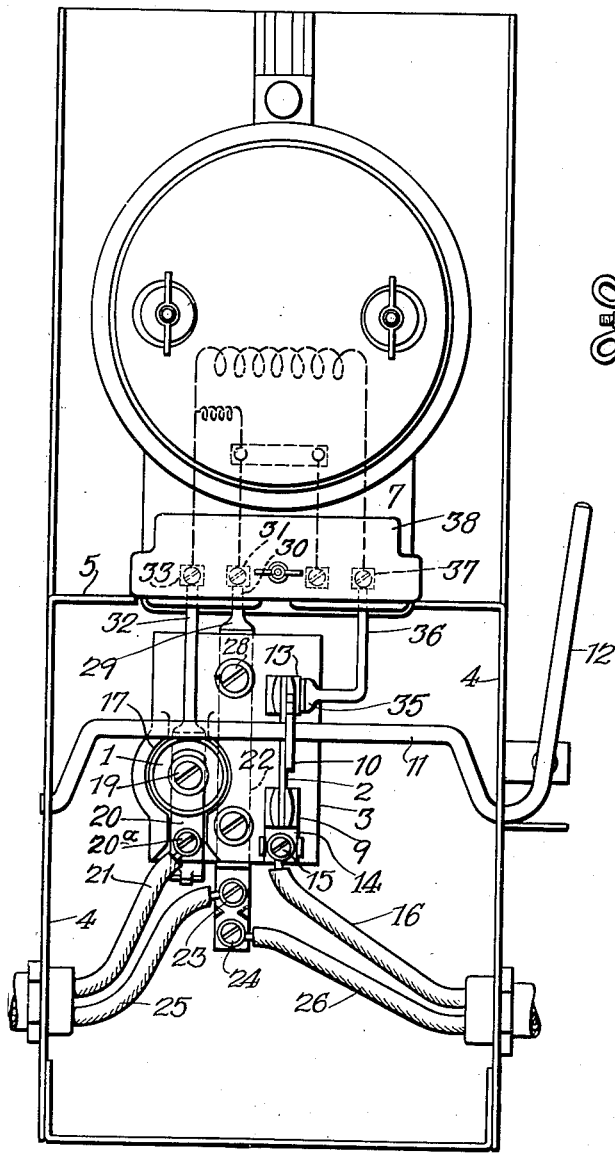
Fig. 1 is a front elevation of a cut-out mechanism installed.

Cutouts of this class generally include a switch for disconnecting the load or service wires from the line or supply, a fuse or fuses and a neutral connection. These parts are of various sorts and arrangements according to the preference of the manufacturers and the system of current distribution. These devices generally have binding screws for connection to line and load wires and for the connection of short wires leading to the meter terminals and have upstanding or accessible connectors to which meter test wires may be connected by the usual clips.

The arrangement illustrated is designed for a two wire system, employing a fuse receptacle 1 and a switch 2 carried on an insulating block 3 mounted in a box 4. The upper end wall 5 of the box has an opening against which the terminal chamber 6 of the meter casing 7 is closely fitted. The box is closed by a cover 8 which is sealed with the seal of the electrical company. The switch blade 2 is pivotally mounted on a plate 9 and has an upstanding projection 10 of insulating material which is forked for engagement by the crank portion 11 of a shaft having bearings in the opposite side walls and an operating arm 12 on the outside. The free end of the switch blade, when closed, engages upstanding projections on a terminal block 13. The plate 9 has a terminal portion 14 carrying a binding screw 15 for attachment of one of the load wires 16.

The fuse socket 17 (Fig. 3) has a terminal plate 18 from which connections are made to the meter terminal. The central fuse terminal 19 is connected to a plate 20 which is provided with a binding screw 20ª for connection to the end of one of the line wires 21.

The neutral fitting is a plate 22 extending from end to end of the block and having on its lower end binding screws 23 and 24 for connection respectively with a line wire 25 and a load wire 26. The present invention is directed particularly to this neutral fitting and to the connection of it and the switch and fuse terminals to the meter terminals.

Figure 2:
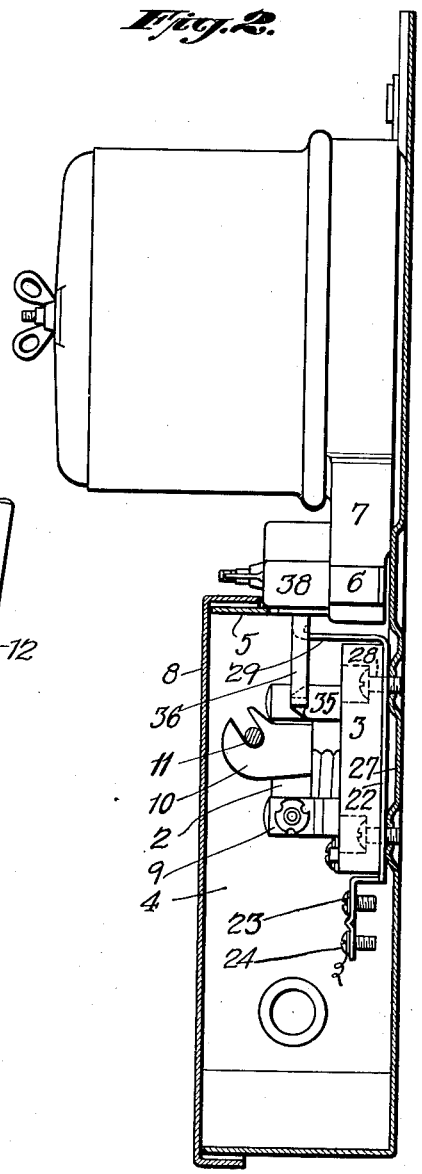
Fig. 2 is a side elevation of the same, with the box in section and the line and load wires omitted.

The neutral fitting is in some cases mounted like the switch and the fuse on the top of the block to insulate it from the box. In the case illustrated however the neutral is to be solidly connected to the box for grounding it. As shown in Fig. 2 it runs along the under side of the block and is fastened on the back wall 27 of the box by means of screws 28 which pass also through the block 3 and fasten it in place.

The neutral fitting has a fixed extension into the meter casing instead of the usual binding screw for a separate wire leading to the meter terminal. This fixed extension is preferably integral as indicated in Figs. 4 and 5 where it has a forward bend 29 to bring it into line and a straight upward extension 30 the end of which is in line for engagement by a screw 31 in the terminal chamber.

Similarly the plate 18 forming a terminal of the fuse has a fixed connection to the meter by means of an integral forward bend 31 and an upward extension 32. A screw 33 in the terminal chamber engages the end of the extension 32 and holds it in contact with a terminal 34 of the meter. See Fig. 3.

The plate 13 forming one terminal of the switch has also a fixed extension formed by a forward bend 35 and an angular upward extension 36 which is engaged by the screw 37 in the meter terminal chamber. The several fastening screws in the meter terminal chamber are normally concealed by the cover 38 which is sealed down.

A common method of stealing current is to break the seal of the box and loosen the screw where the tap for the voltage coil of the meter is connected to the circuit terminals. This causes the meter to stop recording but does not disconnect the customer's load.

For example, the neutral fitting usually has three binding screws for a line wire, a load wire and a wire to the voltage coil 45 of the meter; and if the screw for the last connection be loosened the supply of current is continued to the load wires while the meter stops recording. With the rigid connections to the meter illustrated, the meter coils cannot be thus disconnected except by sawing through the meter connection. Loosening any of the binding screws will cut off the load from the supply.

The terminal screws inside the meter casing may be loosened to break the ordinary meter connection using separate wire connections. But the rigid extensions illustrated will remain in contact even after the screw pressure is removed. Also the breaking of the seal of the meter casing is much less common than the breaking of the seal of the cut out box.

Fig. 6 shows the provisions for testing the meter. The extensions 32 and 36 are shaped for convenient engagement by spring clips 39. The switch is opened and a flexible bridge 40 connected across from the switch blade 2 to the terminal 32 so as to continue the supply of current while the meter is temporarily disconnected. The wire 41 connects with the current coil 41a of the meter.

To the binding screw 24 of the neutral a similar clip attaches a second current coil connection 42. Connectors 43 and 44 are clipped to the lower ends of the neutral and the fuse terminal respectively, for connection to opposite ends of the voltage coil 45. The connectors 41 and 42 lead to current connections, and the connectors 43 and 44 to voltage connections, on a standard or test meter.

For making these current and voltage connections through the coils 41a and 45 of the meter to the test meter, it is usual to provide separate projections on the terminals of the cut out devices, and to run separate wires from the terminals of the meter to the terminals on the block.

The several fittings described may be covered on their exposed surfaces with insulation to provide against accidental contacts. For example, Figs. 7 and 8, show such insulation applied to the fuse connection to the meter. The exposed part 32 has insulating sleeves 46 and 47 which cover the major portion of it, leaving the upper end bare for attachment to the binding screw in the meter casing and leaving the portion 48 bare for receiving the temporary test connection as in Fig. 6.

In referring to the extensions as fixed, I include all extensions which are not readily capable of disconnection like the ordinary binding screw connections. Such fixed connections can be made very simply of integral construction and therefore this is preferred. But various other permanently fixed styles of connection may be resorted to.

Various modifications of the design illustrated may be made by those skilled in the art without departing from the invention as defined in the following claims.

What I claim is:

1. In combination, a meter having a terminal chamber, a metallic casing with a perforated end wall which is closed by the meter terminal chamber when the latter is set in normal working position with respect to the casing, an insulating circuit control appliance base mounted on a wall within the casing, a substantially rigid conducting strip mounted between the base and the wall in contact with each and having an end extended and shaped to project into contact with a meter terminal in the terminal chamber, and securing means extending through the base and the conducting strip and into the wall.

2. In combination, a meter having a terminal chamber, a metallic casing with a perforated end wall which is closed by the meter terminal chamber when the latter is set in normal working position with respect to the casing, an insulating circuit control appliance base mounted on a wall within the casing, a substantially rigid conductor mounted on said base between the base and the wall and having an end extended therefrom and shaped to project into contact with a meter terminal in the terminal chamber whereby said conductor cannot be removed without removing said base from said wall.

3. In combination a meter having a terminal chamber, a metallic casing with a perforated end wall which is closed by the meter terminal chamber when the latter is set in normal working position with respect to the casing, an insulating circuit control appliance base mounted on a wall within the casing, a substantially rigid conductor, and securing means on said base with conductor securing parts extending between the base and the wall whereby said conductor cannot be removed without removing said base, said conductor being extended from said base and shaped to project into contact with a meter terminal in the terminal chamber.

4. In combination, a meter having a terminal chamber, a metallic casing, an insulating circuit control appliance base secured to a wall of the casing, a substantially rigid conductor mounted on said base between the base and the wall and having an end extended therefrom and shaped to project into contact with a meter terminal in said terminal chamber, whereby said conductor cannot be removed without removing said base from said wall, said metallic casing entirely enclosing said conductor until the latter enters said terminal chamber.

5. In combination, a meter having a terminal chamber, a metallic casing, an insulating circuit control appliance base secured to a wall of the casing, a conductor mounted on said base between the base and the wall and having an end extended therefrom and shaped to project into contact with a meter terminal in said terminal chamber, whereby said conductor cannot be removed without removing said base from said wall, said metallic casing entirely enclosing said conductor until the latter enters said terminal chamber.

6. In combination, a meter having a terminal chamber, a metallic casing, an insulating circuit control appliance base secured to a wall of the casing, a conductor mounted on said base and being covered by said base sufficiently to prevent its removal without the removal of said base, and having an end extended from said base and shaped to project into contact with a meter terminal in said terminal chamber, said metallic casing entirely enclosing said conductor until the latter enters said terminal chamber.

ALBERT B. RYPINSKI.